United States Patent
Imajo et al.

(10) Patent No.: US 12,270,335 B2
(45) Date of Patent: Apr. 8, 2025

(54) PIPING SUPPORT STRUCTURE, INTAKE DUCT, AND GAS TURBINE

(71) Applicant: MITSUBISHI HEAVY INDUSTRIES, LTD., Tokyo (JP)

(72) Inventors: Naoto Imajo, Tokyo (JP); Kazuo Hirota, Tokyo (JP); Kota Hosoya, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/704,702

(22) PCT Filed: Oct. 19, 2022

(86) PCT No.: PCT/JP2022/038922
§ 371 (c)(1),
(2) Date: Apr. 25, 2024

(87) PCT Pub. No.: WO2023/105938
PCT Pub. Date: Jun. 15, 2023

(65) Prior Publication Data
US 2024/0418123 A1  Dec. 19, 2024

(30) Foreign Application Priority Data
Dec. 10, 2021 (JP) .................. 2021-200805

(51) Int. Cl.
*F02C 7/047* (2006.01)
*F02C 7/055* (2006.01)
*F16L 3/20* (2006.01)

(52) U.S. Cl.
CPC .............. *F02C 7/047* (2013.01); *F02C 7/055* (2013.01); *F16L 3/20* (2013.01)

(58) Field of Classification Search
CPC ................................ F02C 7/047; F02C 7/055
See application file for complete search history.

(56) References Cited

U.S. PATENT DOCUMENTS

| | | | | |
|---|---|---|---|---|
| 3,016,219 A | * | 1/1962 | Murphy | ................... F16L 3/16 248/55 |
| 2015/0000766 A1 | | 1/2015 | Arizpe et al. | |
| 2018/0274445 A1 | | 9/2018 | Sankarakumar et al. | |

FOREIGN PATENT DOCUMENTS

| | | |
|---|---|---|
| JP | 50-3208 | 2/1975 |
| JP | 55-145780 | 10/1980 |

(Continued)

OTHER PUBLICATIONS

International Search Report issued Dec. 27, 2022 in corresponding International Application No. PCT/JP2022/038922, with English translation.

(Continued)

*Primary Examiner* — Steven M Sutherland
(74) *Attorney, Agent, or Firm* — Wenderoth, Lind & Ponack, L.L.P.

(57) ABSTRACT

The support structure of the present disclosure is a piping support structure that supports piping comprising: a header pipe extending in a first direction within a cross section of a duct and having an inlet formed therein through which a high-temperature fluid flows; and a plurality of nozzle pipes integrally provided with the header pipe, extending in a second direction orthogonal to the first direction, and arranged in the first direction. The support structure comprises: ridges protruding from surfaces on at least one side of the outer peripheral surfaces of the nozzle pipes in a third direction orthogonal to the first direction and the second direction; and a support member fixed to the duct and having formed therein a guide groove to which the ridge is fitted and which guides the ridge in the direction of heat extension of the header pipe and the nozzle pipes.

12 Claims, 7 Drawing Sheets

(56) References Cited

FOREIGN PATENT DOCUMENTS

| | | |
|---|---|---|
| JP | 61-070674 | 5/1986 |
| JP | 11-141747 | 5/1999 |
| JP | 2004-150385 | 5/2004 |
| JP | 5758151 | 8/2015 |

OTHER PUBLICATIONS

Written Opinion of the International Searching Authority issued Dec. 27, 2022 in corresponding International Application No. PCT/JP2022/038922, with English translation.

* cited by examiner

PIPING SUPPORT STRUCTURE, INTAKE DUCT, AND GAS TURBINE

TECHNICAL FIELD

The present disclosure relates to a pipe support structure, an air intake duct, and a gas turbine.

This application claims priority to Japanese Patent Application No. 2021-200805, filed in Japan on Dec. 10, 2021, the contents of which are incorporated herein by reference.

BACKGROUND ART

An inlet bleed heater (IBH) for heating incoming air is provided in an air intake duct of a gas turbine. For example, this type of device includes a header pipe that extends in a horizontal direction in a cross section of the air intake duct and a plurality of nozzle pipes that extend upward from the header pipe and are arranged at intervals in the horizontal direction. During the operation of a plant, thermal elongation occurs in the header pipe and the nozzle pipes due to a temperature change. When the pipe is supported at a plurality of locations, there is a concern that the pipe will be damaged due to a difference in the amount of thermal elongation between the pipe and a support member. Therefore, in the related art, only the lower end portions of the nozzle pipes are generally supported by the header pipe.

Therefore, vibration may occur in the nozzle pipe due to the influence of the flow of air in the air intake duct. For example, a technique disclosed in the following PTL 1 is known as a technique for reducing the vibration. A pipe support structure according to the following PTL 1 includes a support main body that is fixed to a pipe, stoppers that can come into contact with the support main body such that the support main body is interposed therebetween, and coil springs that bias the stoppers toward the support main body. In a case where an exciting force is applied to the pipe, the stoppers come into contact with the support main body to suppress vibration. Further, when thermal elongation occurs in the pipe, the stoppers are moved against the biasing force of the coil springs to allow the thermal elongation of the pipe.

CITATION LIST

Patent Literature

[PTL 1] Japanese Patent No. 5758151

SUMMARY OF INVENTION

Technical Problem

However, in a case where the above-described support structure is applied to the nozzle pipes of the inlet bleed heater, there is a problem in that the structure is complicated due to a large number of nozzle pipes, which leads to an increase in manufacturing cost and maintenance costs.

The present disclosure has been made in order to solve the above problem, and an object of the present disclosure is to provide a pipe support structure, an air intake duct, and a gas turbine that have a simpler structure and that can suppress vibration while allowing thermal elongation of a pipe.

Solution to Problem

In order to achieve the object, according to the present disclosure, there is provided a pipe support structure that supports a pipe including a header pipe which extends in a first direction in a cross section of a duct and in which an inlet, into which a high-temperature fluid flows, is formed and a plurality of nozzle pipes that are provided integrally with the header pipe, extend in a second direction orthogonal to the first direction, and are arranged at intervals in the first direction. The pipe support structure includes: a projecting portion that projects from at least one surface in a third direction orthogonal to the first direction and the second direction in an outer peripheral surface of the nozzle pipe; and a support member which is fixed to the duct and in which a guide groove, to which the projecting portion is fitted and which guides the projecting portion in a thermal elongation direction of the header pipe and the nozzle pipe, is formed.

According to the present disclosure, there is provided a pipe support structure that supports a pipe including a header pipe which extends in a first direction in a cross section of a duct and in which an inlet, into which a high-temperature fluid flows, is formed and a plurality of nozzle pipes that are provided integrally with the header pipe, extend in a second direction orthogonal to the first direction, and are arranged at intervals in the first direction. The pipe support structure includes: a first member that is fixed to the duct and that has a first support surface which is capable of coming into contact with each of the nozzle pipes from a side close to the inlet in the first direction; and a second member that is fixed to the duct and that has a second support surface which is capable of coming into contact with each of the nozzle pipes from a side opposite to the inlet in the first direction.

According to the present disclosure, there is provided an air intake duct including: a tubular duct main body; a pipe that is disposed in the duct main body; and the pipe support structure that supports the pipe.

According to the present disclosure, there is provided a gas turbine including: the air intake duct; a compressor that compresses air supplied through the air intake duct to generate high-pressure air; a combustor that mixes the high-pressure air with fuel and that burns a mixture to generate a high-temperature and high-pressure combustion gas; and a turbine that is driven by the combustion gas.

Advantageous Effects of Invention

According to the present disclosure, it is possible to provide a pipe support structure, an air intake duct, and a gas turbine that have a simpler structure and that can suppress vibration while allowing thermal elongation of a pipe.

DESCRIPTION OF EMBODIMENTS

First Embodiment (Configuration of Gas Turbine)

Figure 1:
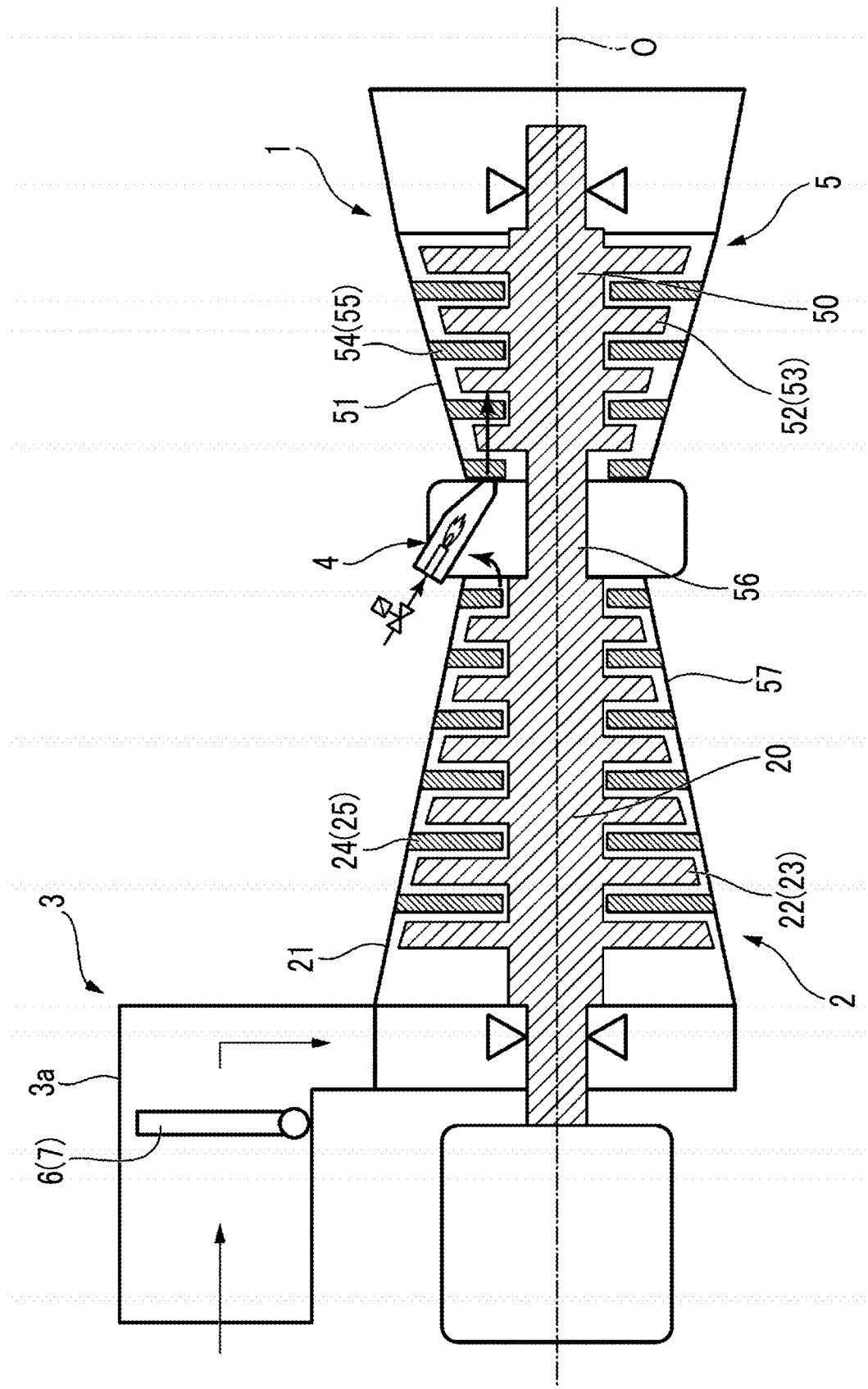
FIG. 1 is a schematic diagram illustrating a configuration of a gas turbine according to a first embodiment of the present disclosure.

Hereinafter, a gas turbine 1 and a pipe support structure 7 (hereinafter, simply referred to as a support structure 7) according to a first embodiment of the present disclosure will be described with reference to FIGS. 1 to 5. As illustrated in FIG. 1, the gas turbine 1 includes a compressor 2, an air intake duct 3, a combustor 4, and a turbine 5.

The compressor 2 compresses outside air to generate high-pressure air. The compressor 2 includes a compressor rotor 20 and a compressor casing 21. The compressor rotor 20 extends along an axis O and is supported to be rotatable about the axis O. A plurality of compressor rotor blade rows 22 that are arranged at intervals in a direction of the axis O are provided an outer peripheral surface of the compressor rotor 20. Each of the compressor rotor blade rows 22 has a plurality of compressor rotor blades 23 that extend in a radial direction and that are arranged at intervals in a circumferential direction.

The compressor casing 20 has a tubular shape that covers the compressor rotor 21 from an outer peripheral side. A plurality of compressor stator blade rows 24 that are arranged at intervals in the direction of the axis O are provided on an inner peripheral surface of the compressor casing 21. Each of the compressor stator blade rows 24 has a plurality of compressor stator blades 25 that extend in the radial direction and that are arranged at intervals in the circumferential direction. The compressor rotor blade rows 22 and the compressor stator blade rows 24 are arranged so as to alternate in the direction of the axis O. That is, one compressor rotor blade row 22 is disposed adjacent to one compressor stator blade row 24.

The air intake duct 3 has a tubular duct main body 3a, an inlet bleed heater 6 (pipe), and the support structure 7. The duct main body 3a forms a flow path for guiding outside air into the compressor casing 21. The inlet bleed heater 6 (pipe), the support structure 7, and a filter device (not illustrated) are provided in the duct main body 3a. The inlet bleed heater 6 and the support structure 7 will be described below.

The combustor 4 mixes fuel with the high-pressure air generated by the compressor 2 and burns the mixture to generate a high-temperature and high-pressure combustion gas. A plurality of combustors 4 are arranged at intervals in the circumferential direction with respect to the axis O in a region between the compressor casing 21 and a turbine casing 51 which will be described below. In addition, in FIG. 1, for simplicity of illustration, only one combustor 4 is illustrated. The combustion gas generated by the combustor 4 is sent to the turbine 5.

The turbine 5 has a turbine rotor 50 and the turbine casing 51. The turbine rotor 50 extends along the axis O and is supported to be rotatable about the axis O. A plurality of turbine rotor blade rows 52 that are arranged at intervals in the direction of the axis O are provided on an outer peripheral surface of the turbine rotor 50. Each of the turbine rotor blade rows 52 has a plurality of turbine rotor blades 53 that extend in the radial direction and that are arranged at intervals in the circumferential direction.

The turbine casing 51 has a tubular shape that covers the turbine rotor 50 from the outer peripheral side. A plurality of turbine stator blade rows 54 that are arranged at intervals in the direction of the axis O are provided on an inner peripheral surface of the turbine casing 51. Each of the turbine stator blade rows 54 has a plurality of turbine stator blades 55 that extend in the radial direction and are arranged at intervals in the circumferential direction. The turbine rotor blade rows 52 and the turbine stator blade rows 54 are arranged so as to alternate in the direction of the axis O. That is, one turbine rotor blade row 52 is disposed adjacent to one turbine stator blade row 54.

In the gas turbine 1 described here, the compressor rotor 20 and the turbine rotor 50 are coaxially connected in the direction of the axis O to form a gas turbine rotor 56. In addition, the compressor casing 21 and the turbine casing 51 are connected in the direction of the axis O to form a gas turbine casing 57. That is, the compressor rotor 20 and the turbine rotor 50 can be rotated integrally about the axis O as the gas turbine rotor 56. Further, it is also possible to apply the configuration according to this embodiment to a two-shaft gas turbine in which the compressor rotor 20 and the turbine rotor 50 are not mechanically connected.

In the gas turbine 1 having the above-described configuration, the compressor 2 compresses air supplied from the outside through the air intake duct 3 to generate high-pressure air. The combustor 4 mixes the high-pressure air with fuel and burns the mixture to generate a high-temperature and high-pressure combustion gas. The combustion gas is sent to the turbine 5 and collides with the turbine rotor blade rows 52 to give a rotational force to the turbine rotor 50. Therefore, the gas turbine rotor 56 is integrally driven to be rotated. The rotational force of the gas turbine rotor 56 is taken out from a shaft end and is used to drive a generator or the like.

(Configuration of Pipe and Support Structure)

Figure 2:
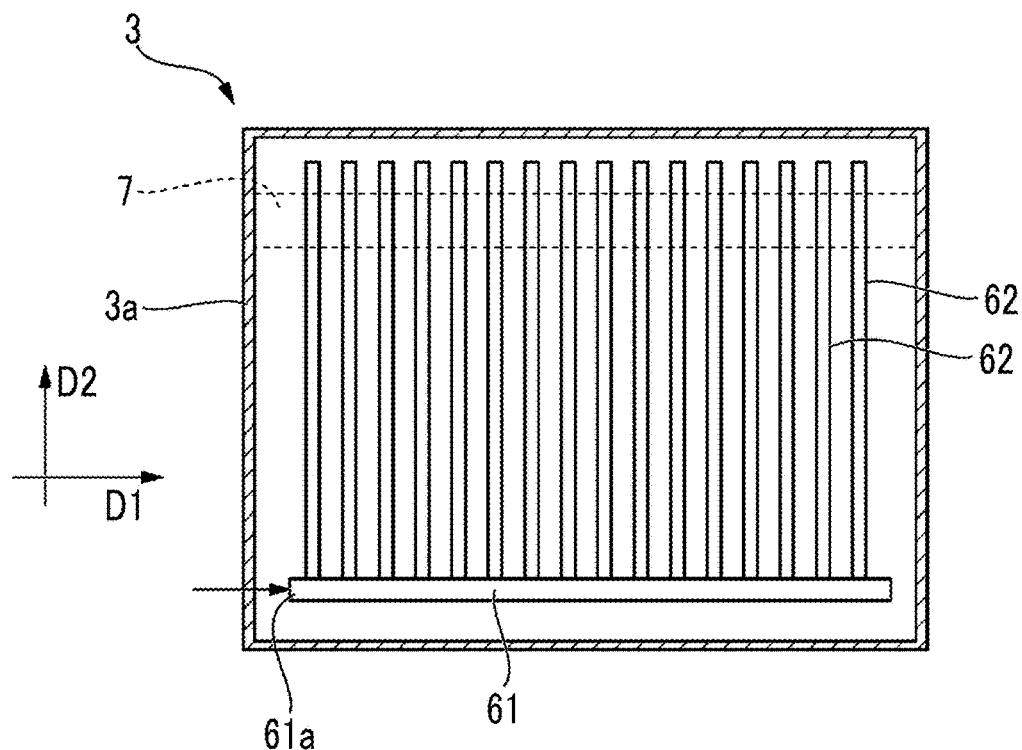
FIG. 2 is a front view illustrating a configuration of a pipe according to the first embodiment of the present disclosure.

The inlet bleed heater 6 (pipe) is provided in the duct main body 3a in order to regulate the inlet air temperature of the compressor 2. As illustrated in FIG. 2, the duct main body 3a has a rectangular cross-sectional shape when viewed from a direction in which air circulates. The inlet bleed heater 6 is configured by a plurality of pipes that are arranged in the rectangular cross section. Specifically, the inlet bleed heater 6 has a header pipe 61 and a plurality of nozzle pipes 62.

The header pipe 61 extends in a first direction D1 (for example, a horizontal direction) and is disposed at a position close to a bottom surface of the air intake duct 3. An inlet 61a for taking a high-temperature fluid (high-temperature air) supplied from the outside to the inside is formed in one end portion of the header pipe 61 in the first direction D1. In the following description, in some cases, the side on which the inlet 61a is located in the first direction D1 is referred to as a header pipe upstream side, and the side away from the inlet 61a is referred to as a header pipe downstream side.

The nozzle pipes 62 are provided integrally with the header pipe 61. A plurality of nozzle pipes 62 extend in a second direction D2 (for example, a vertical direction) orthogonal to the first direction D1 and are provided at intervals in the first direction D1. A plurality of nozzles that are arranged at intervals in the second direction D2 are formed in an outer peripheral surface of the nozzle pipe 62, which is not illustrated in detail. The high-temperature air is jetted from these nozzles.

Figure 3:
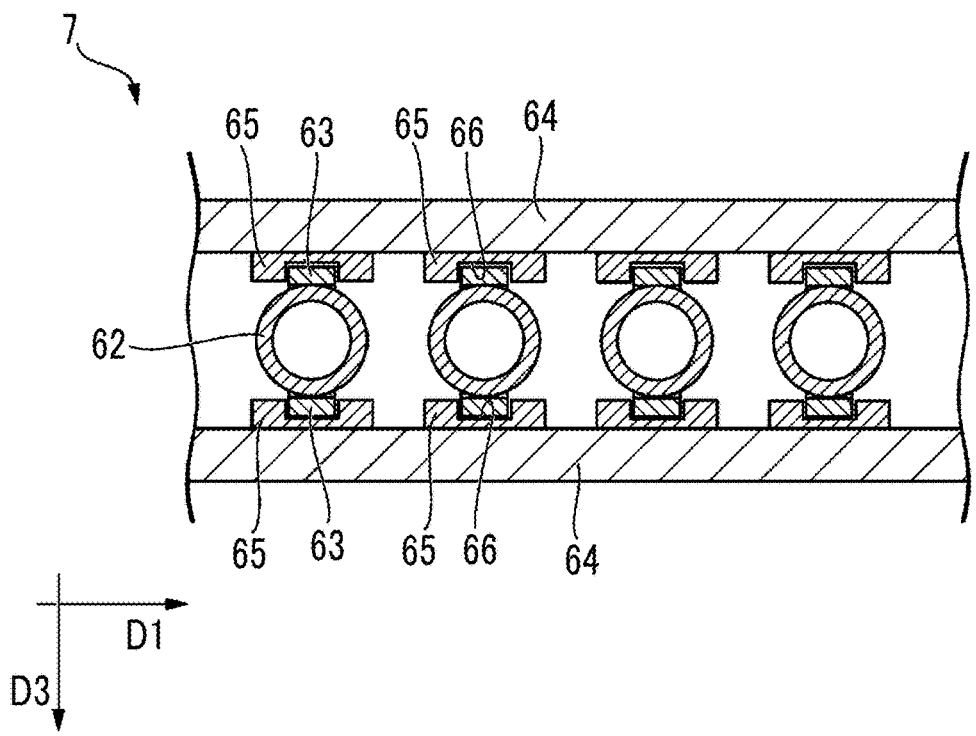
FIG. 3 is a cross-sectional view illustrating a configuration of a pipe support structure according to the first embodiment of the present disclosure.

The support structure 7 is provided to support the nozzle pipes 62 in the air intake duct 3. As illustrated in FIG. 3, the support structure 7 has a projecting portion 63 that is provided on the outer peripheral surface of the nozzle pipe 62, a base plate 64 that is fixed to the air intake duct, and a plurality of support members 65 that are fixed to the base plate 64.

Here, a direction (that is, a direction in which air circulates in the air intake duct 3) orthogonal to the first direction D1 and the second direction D2 is referred to as a third direction D3. A pair of projecting portions 63 are provided so as to project from both sides of the outer peripheral surface of each nozzle pipe 62 in the third direction D3. For example, the cross-sectional shape of the projecting portion 63 when viewed from the second direction D2 is a rectangular shape. It is desirable that the positions of the projecting portions 63 in the second direction D2 are the same in all of the nozzle pipes 62. In addition, the projecting portion 63 may have the above-described protruding shape or may have a cylindrical shape or a columnar shape.

A pair of base plates 64 extend in the second direction D2 in the air intake duct 3 and are disposed with a gap therebetween in the third direction D3. The nozzle pipes 62 are located between the pair of base plates 64.

Figure 4:
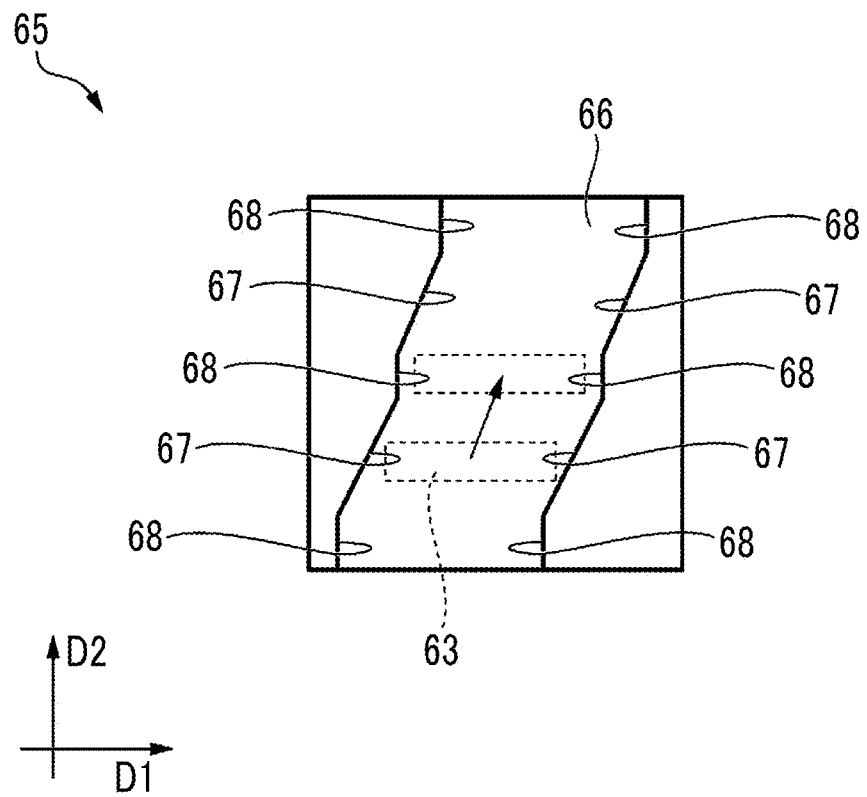
FIG. 4 is an enlarged view illustrating a configuration of a support member according to the first embodiment of the present disclosure.

The support member 65 is fixed to a surface, which faces the nozzle pipe 62, of both surfaces of each of the base plates 64. A guide groove 66 to which the projecting portion 63 is fitted is formed in a surface of the support member 65 which faces the nozzle pipe 62. As illustrated in FIG. 4, as a whole, the guide groove 66 extends toward one side (upper side) of the second direction D2 moving away from the inlet 61a in the first direction D1. That is, the guide groove 66 is inclined with respect to the second direction D2.

An inclined surface 67 and a step surface 68 are formed on an inner side wall of the guide groove 66. The inclined surface 67 extends toward one side (upper side) of the second direction D2 moving away from the inlet 61a in the first direction D1. The step surface 68 extends in the second direction D2. The inclined surface 67 and the step surface 68 are arranged so as to alternate in the second direction D2. The number of step surfaces 68 provided is appropriately determined on the basis of an operation aspect of the gas turbine 1. In FIG. 4, for example, three pairs of step surfaces 68 are formed on the inner side wall, and the inclined surfaces 67 are formed so as to connect these step surfaces 68.

A separation dimension (that is, a dimension in the first direction D1) between the pair of inner side walls is set to be slightly larger than the dimension of the projecting portion 63 in the first direction D1.

Figure 5:
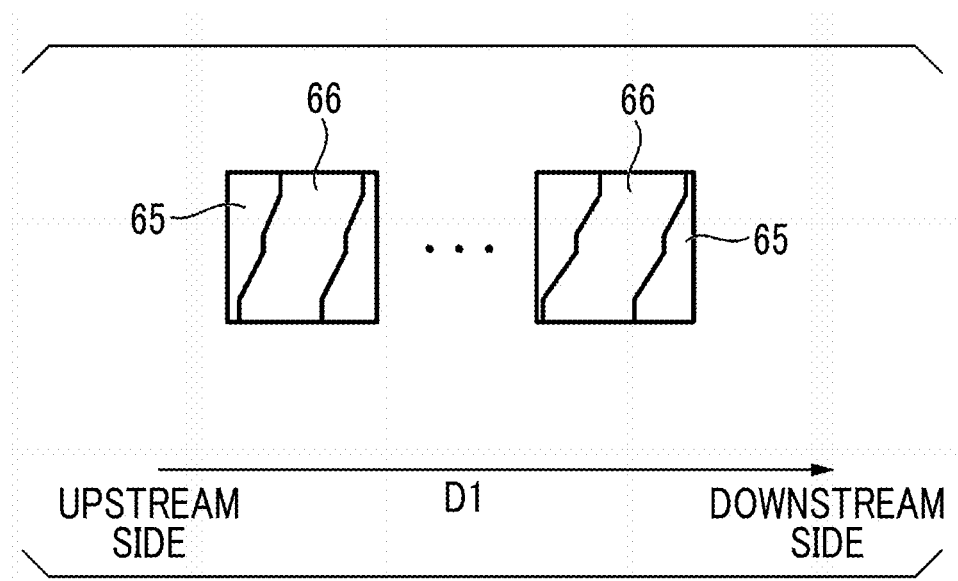
FIG. 5 is a diagram illustrating a relationship between a position of the support member and an extension direction of a guide groove according to the first embodiment of the present disclosure.

In addition, as illustrated in FIG. 5, for the support member 65 closer to the header pipe downstream side in the first direction D1 among the plurality of support members 65, the overall inclination angle of the guide groove 66 is larger. In other words, for the support member 65 closer to the header pipe downstream side, the angle of the inclined surface 67 with respect to the second direction D2 is larger.

(Operation and Effect)

When the inlet bleed heater 6 is operated, the high-temperature fluid ((high-temperature air) flows from the inlet 61a into the header pipe 61. The high-temperature fluid is eventually distributed to each nozzle pipe 62 and is jetted from the nozzles into the air intake duct 3. In this case, as time elapses from the start of the operation, the temperatures of the header pipe 61 and the nozzle pipe 62 rise, and thermal elongation occurs. Specifically, since the high-temperature fluid circulates in the header pipe 61, the header pipe 61 is thermally elongated toward the header pipe downstream side in the first direction D1. That is, the dimension extends from the inlet 61a provided on the header pipe upstream side toward the header pipe downstream side. The nozzle pipe 62 is thermally elongated from the end portion close to the header pipe 61 toward the upper side in the second direction D2 while being displaced in the first direction D1 with the thermal elongation of the header pipe 61.

Further, since the nozzle pipe 62 is exposed to the flow of air in the air intake duct 3, the nozzle pipe 62 is excited by fluid force. When vibration increases, there is a concern that the nozzle pipe 62 will cause fatigue failure. For this reason, it is necessary to suppress the vibration of the nozzle pipe 62 while allowing the thermal elongation. Therefore, in this embodiment, the support structure having the above-described configuration is adopted.

According to the above-described configuration, each nozzle pipe 62 is supported in the third direction D3 by the support member 65. Therefore, it is possible to suppress the occurrence of vibration even in a case where an exciting force is applied to the nozzle pipe 62. In particular, it is possible to effectively suppress vibration in the third direction D3. Further, the projecting portion 63 is guided in the thermal elongation direction of the header pipe 61 and the nozzle pipe 62 by the guide groove 66 of the support member 65. Therefore, the nozzle pipe 62 can be stably supported without being deformed before and after the thermal elongation occurs. Further, since the projecting portion 63 is fitted into the guide groove 66, it is also possible to effectively suppress the vibration of the nozzle pipe 62 in the second direction D2.

Here, the header pipe 61 is thermally elongated in the first direction D1 because the high-temperature fluid therein circulates therein. The nozzle pipe 62 is thermally elongated in the second direction D2 while being displaced in the first direction D1 with the thermal elongation of the header pipe 61. That is, the projecting portion 63 provided in the nozzle pipe 62 is obliquely displaced from an initial position in the first direction D1 and the second direction D2. According to the above-described configuration, since the inclined surface 67 is formed on the inner side wall of the guide groove 66, the projecting portion 63 is guided while coming into contact with the inclined surface 67. Therefore, the nozzle pipe 62 can be stably supported without being deformed before and after the thermal elongation occurs.

However, in the gas turbine 1, in a range from a stopped state to a maximum rated operation, an operating rotation speed is kept constant, and the temperature of bleed air is kept constant. Therefore, new thermal elongation does not occur in the header pipe 61 or the nozzle pipe 62. That is, the projecting portion 63 stays at a fixed position. According to the above-described configuration, in this state, the projecting portion 63 can be supported by the step surface 68 from both sides in the first direction D1. That is, the step surface 68 comes into contact with the projecting portion 63 in a direction directly opposite to the vibration direction of the nozzle pipe 62. Therefore, it is possible to further stably support the nozzle pipe 62.

Here, in the header pipe 61 extending in the first direction D1, the amount of thermal elongation increases as the distance from the inlet 61a into which the high-temperature fluid flows increases. That is, the displacement of the nozzle pipe 62 at a position further away from the inlet 61a is larger in the first direction D1. In other words, in the total amount of displacement of the projecting portion 63 provided in the nozzle pipe 62, the percentage of the amount of displacement of the projecting portion 63 in the first direction D1 is higher than the percentage of the amount of displacement of the projecting portion 63 in the second direction D2. According to the above-described configuration, for the guide groove 66 located at a position further away from the inlet 61a, the angle of an extension direction of the guide groove 66 with respect to the second direction D2 is larger. Therefore, it is possible to appropriately support the projecting portion 63 according to a change in the amount of thermal elongation based on the position of the nozzle pipe 62.

The first embodiment of the present disclosure has been described above. In addition, the above-described configuration can be changed or modified in various manners without departing from the gist of the present disclosure. For example, in the first embodiment, an example in which the base plates 64 and the support members 65 are provided on both sides in the third direction D3 has been described. However, the base plate 64 and the support members 65 may be provided on at least one side in the third direction D3.

Figure 6:
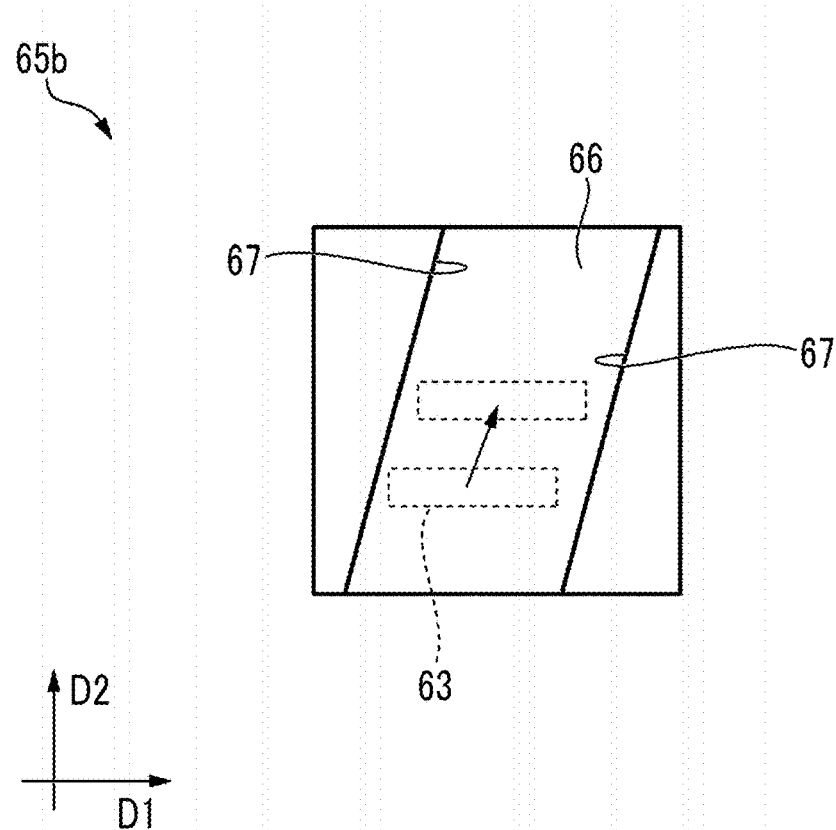
FIG. 6 is an enlarged view illustrating a first modification example of the support member according to the first embodiment of the present disclosure.

Furthermore, in the first embodiment, an example in which the inclined surface 67 and the step surface 68 are formed on the inner side wall of the guide groove 66 of the support member 65 has been described. However, as in a support member 65b illustrated in FIG. 6, the step surface 68 may not be formed, and the inner side wall can be formed only by the inclined surface 67.

Figure 7:
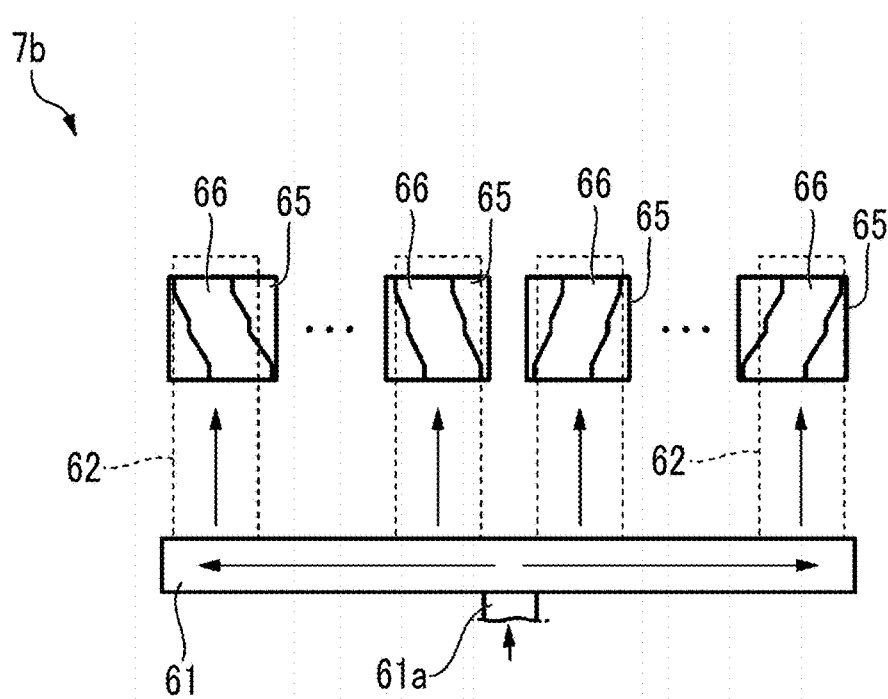
FIG. 7 is an enlarged view illustrating a second modification example of the support member according to the first embodiment of the present disclosure.

In addition, in the first embodiment, an example in which the inlet 61a is provided on one side of the header pipe 61 in the first direction D1 has been described. However, the position of the inlet 61a is not limited thereto. For example, it is also possible to adopt a configuration in which the inlet 61a is formed in a central portion of the header pipe 61 in the first direction D1 as in a support structure 7b illustrated in FIG. 7. In this case, both sides of the inlet 61a in the header pipe 61 are thermally elongated in the directions away from each other. Therefore, it is desirable that the extension directions of the guide grooves 66 of the support members 65 on both sides of the inlet 61a are inclined in opposite directions so as to be axisymmetric with respect to the inlet 61a. According to this configuration, the ratio between the amounts of thermal elongation of portions of the header pipe 61 on both sides of the inlet 61a is 50 to 50, as compared to a case where the inlet 61a of the header pipe 61 is provided on one side in the first direction D1. Therefore, since the relative positions of the header pipe 61 and the support members 65 do not change significantly, it is possible to reduce wrenching or twisting of the pipe due to thermal elongation.

Second Embodiment

Figure 8:
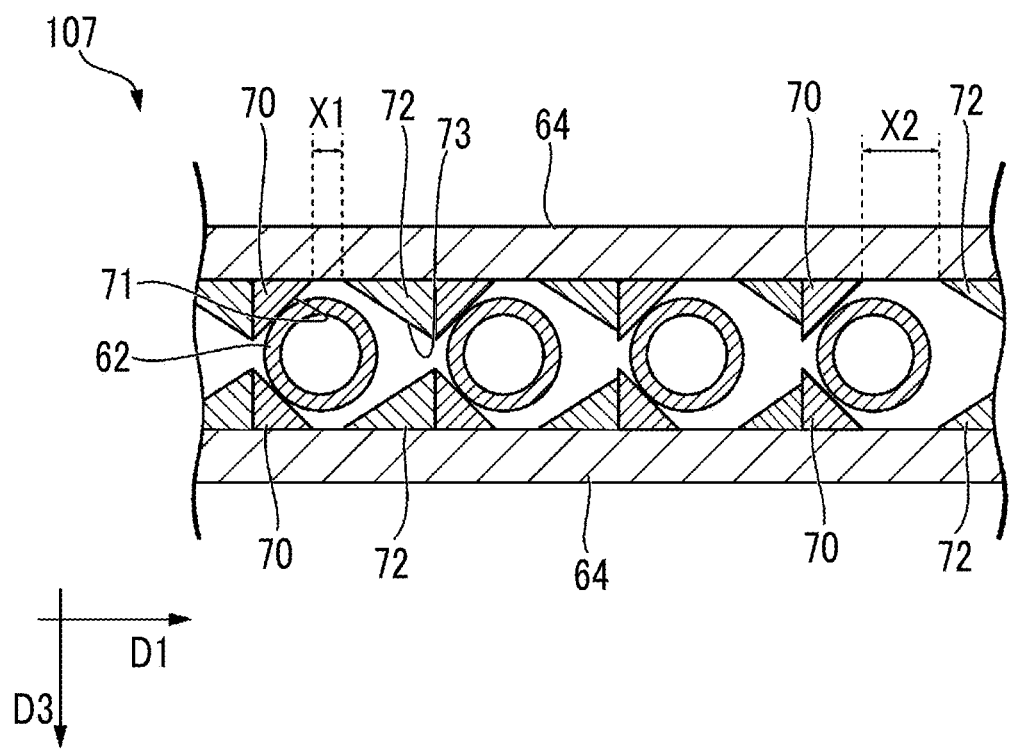
FIG. 8 is a cross-sectional view illustrating a configuration of a pipe support structure according to a second embodiment of the present disclosure.

Next, a second embodiment of the present disclosure will be described with reference to FIGS. 8 and 9. In addition, the same configurations as those in the first embodiment are denoted by the same reference numerals, and detailed description thereof will be omitted. As illustrated in FIG. 8, a support structure 107 according to this embodiment has a first member 70 and a second member 72.

Each of the first member 70 and the second member 72 is fixed to the base plate 64. The first member 70 has a first support surface 71. The first support surface 71 can come into contact with the nozzle pipe 62 from a side close to the inlet 61a in the first direction D1. Specifically, the first support surface 71 is inclined so as to extend in a direction further away from the nozzle pipe 62 moving further away from the inlet 61a in the first direction D1. The first members 70 are provided on a pair of base plates 64 such that the first members 70 forming each pair face each other for each nozzle pipe 62.

The second member 72 is disposed apart from the first member 70 in the first direction D1. The second member 72 has a second support surface 73. The second support surface 73 can come into contact with the nozzle pipe 62 from a side opposite to the inlet 61a in the first direction D1. Specifically, the second support surface 73 is inclined so as to extend in a direction closer to the nozzle pipe 62 moving further away from the inlet 61a in the first direction D1. The second members 72 are provided on the pair of base plates 64 such that the second members 72 forming each pair face each other for each nozzle pipe 62.

Of distances X1 and X2 between the first member 70 and the second member 72 in the first direction D1, the separation distance X2 between the first member 70 and the second member 72 located at positions further away from the inlet 61a in the first direction D1 is larger than the separation distance X1. That is, for the first member 70 and the second member 72 located at the positions further away from the inlet 61a, the separation distance therebetween is larger.

Figure 9:
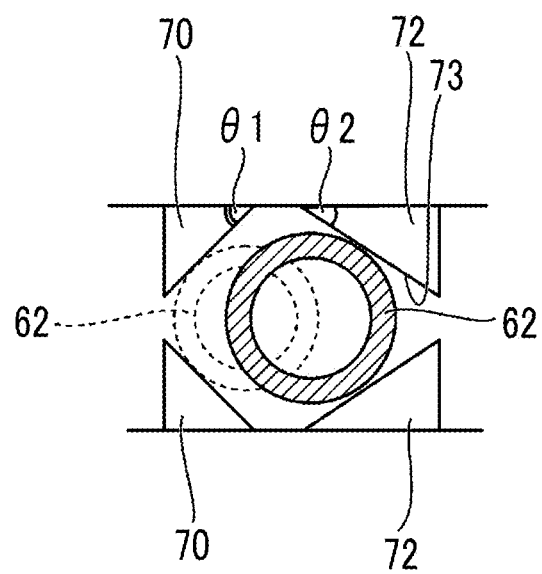
FIG. 9 is an enlarged sectional view illustrating a configuration of a first member and a second member according to the second embodiment of the present disclosure.

Further, as illustrated in FIG. 9, an angle θ2 of the second support surface 73 of the second member 72 with respect to the first direction D1 is smaller than an angle θ1 of the first support surface 71 of the first member 70 with respect to the first direction D1.

(Operation and Effect)

According to the above-described configuration, when the header pipe 61 and the nozzle pipe 62 are in a low-temperature state, the first support surface 71 of the first member 70 comes into contact with the nozzle pipe 62 to support the nozzle pipe 62. On the other hand, when the header pipe 61 and the nozzle pipe 62 are in a high-temperature state, the second support surface 73 of the second member 72 comes into contact with the nozzle pipe 62 moved in the first direction D1 to support the nozzle pipe 62. Therefore, it is possible to stably support the nozzle pipe 62 and to suppress vibration at a low temperature and at a high temperature.

Furthermore, according to the above-described configuration, the nozzle pipe 62 can be interposed between a pair of first support surfaces 71 and a pair of second support surfaces 73 in the first direction D1 and the second direction D2 to be supported. Therefore, the displacement of the nozzle pipe 62 is regulated in both the first direction D1 and the second direction D2 in the low-temperature state before thermal elongation occurs and in the high-temperature state in which the thermal elongation reaches the maximum amount, which makes it possible to more actively suppress vibration.

Here, in the header pipe 61 extending in the first direction D1, the amount of thermal elongation increases as the distance from the inlet 61a into which the high-temperature fluid flows increases. That is, the displacement of the nozzle pipe 62 at a position further away from the inlet 61a is larger in the first direction D1. According to the above-described configuration, for the first member 70 and the second member 72 located at the positions further away from the inlet 61a, the distance therebetween is larger. Therefore, for the nozzle pipe 62 that is further away from the inlet 61a, a larger amount of displacement thereof in the second direction D2 due to thermal elongation is allowed. As described above, it is possible to appropriately support the nozzle pipe 62 according to a change in the amount of thermal elongation based on the position of the header pipe 61 in the first direction D1.

Furthermore, the angle θ2 of the second support surface 73 of the second member 72 with respect to the first direction D1 is smaller than the angle θ1 of the first support surface 71 of the first member 70 with respect to the first direction D1. Therefore, even in a case where the diameter of the nozzle pipe 62 is increased due to thermal elongation (see FIG. 9), the nozzle pipe 62 can be stably interposed between the second support surfaces 73 to be supported. In other words, the nozzle pipe 62 whose diameter has been increased is likely to enter a space between a pair of second support surfaces 73. Further, the angle θ2 is smaller than θ1. Therefore, in a case where the nozzle pipe 62 comes off the second support surface 73 of the second member 72 and vibrates, D1-direction components when the nozzle pipe 62 rebounds from the second support surface 73 are reduced. Therefore, the rebounded nozzle pipe 62 immediately hits another second support surface 73 facing the other opposing second support surface 73, which makes it possible to avoid an increase in the amplitude of the nozzle pipe 62.

Figure 10:
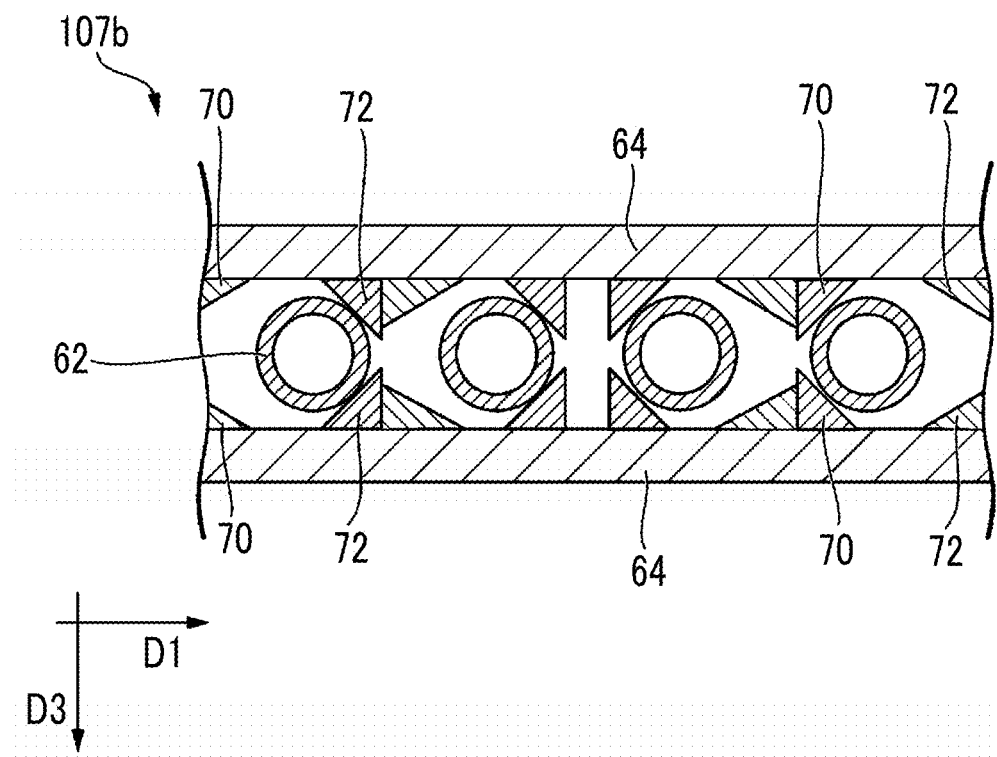
FIG. 10 is a cross-sectional view illustrating a modification example of the pipe support structure according to the second embodiment of the present disclosure.

The second embodiment of the present disclosure has been described above. In addition, the above-described configuration can be changed or modified in various manners without departing from the gist of the present disclosure. For example, the inlet 61a can be provided in the central portion of the header pipe 61 as described with reference to FIG. 7 in the first embodiment. In this case, both sides of the inlet 61a in the header pipe 61 are thermally elongated in the directions away from each other. Therefore, as in a support structure 107b illustrated in FIG. 10, it is desirable that the first members 70 and the second members 72 on both sides of the inlet 61a are disposed so as to be axisymmetric with respect to the inlet 61a. That is, it is desirable that the second member 72 is disposed on a side away from the inlet 61a and that the first member 70 is disposed on a side close to the inlet 61a with reference to each nozzle pipe 62.

Third Embodiment

Figure 11:
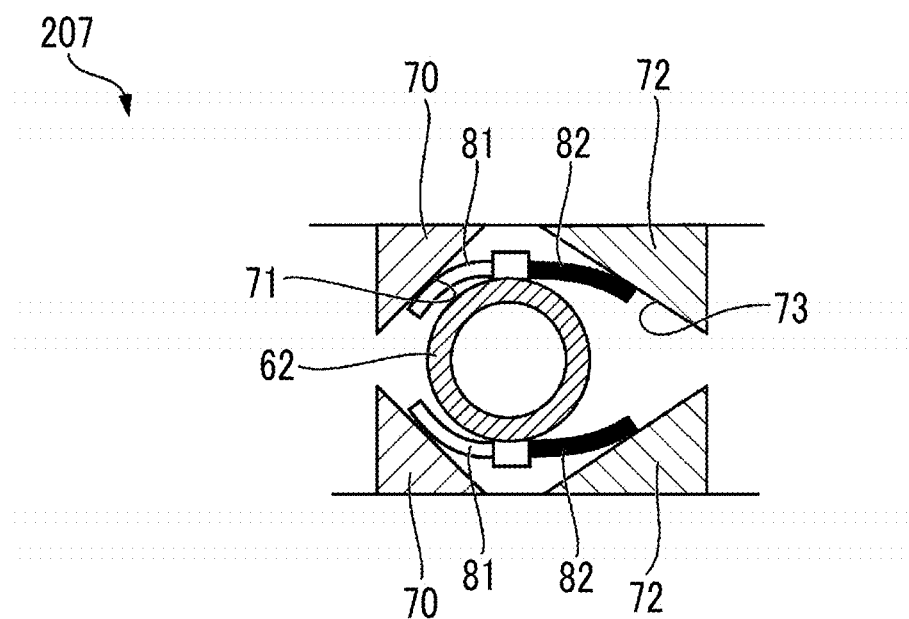
FIG. 11 is a cross-sectional view illustrating a configuration of a pipe support structure according to a third embodiment of the present disclosure and is a diagram illustrating a low-temperature state.
Figure 12:
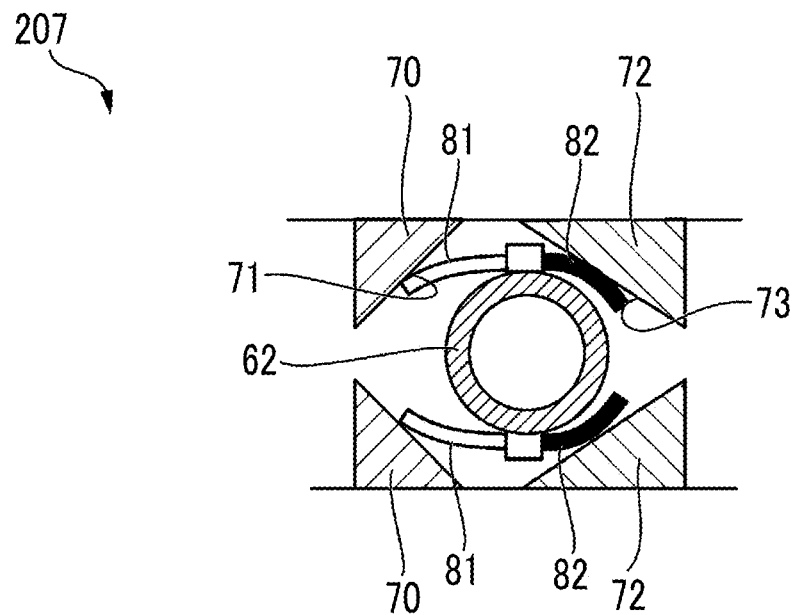
FIG. 12 is a cross-sectional view illustrating the configuration of the pipe support structure according to the third embodiment of the present disclosure and is a diagram illustrating a high-temperature state.
Figure 13:
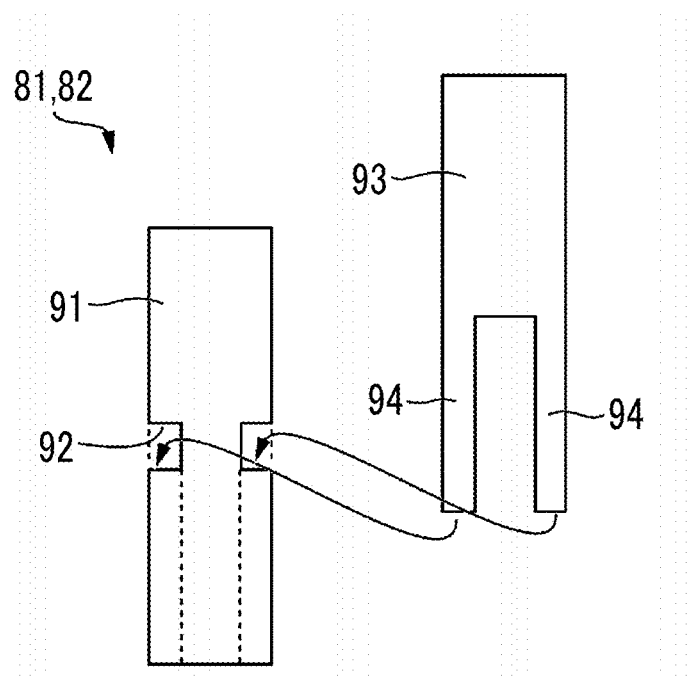
FIG. 13 is an exploded view illustrating a configuration of a first bimetal member and a second bimetal member according to the third embodiment of the present disclosure.

Next, a third embodiment of the present disclosure will be described with reference to FIGS. 11 to 13. In addition, the same configurations as those in each of the above-described embodiments are denoted by the same reference numerals, and detailed description thereof will be omitted. As illustrated in FIG. 11 or FIG. 12, a support structure 207 according to this embodiment further includes a first bimetal member 81 and a second bimetal member 82 that are attached to the outer peripheral surface of each nozzle pipe 62 in addition to the configurations described in the second embodiment.

A pair of the first bimetal members 81 are provided on a side close to the inlet 61a in the first direction D1 on the outer peripheral surface of the nozzle pipe 62. The first bimetal member 81 is configured to have a shape along the outer peripheral surface of the nozzle pipe 62 in the low-temperature state. On the other hand, the first bimetal member 81 is configured to have a shape that is separated from the outer peripheral surface of the nozzle pipe 62 in the high-temperature state. Therefore, the first bimetal member 81 can come into contact with the first support surface 71 in the high-temperature state.

The second bimetal member 82 is provided on a side opposite to the inlet 61a in the first direction D1 on the outer peripheral surface of the nozzle pipe 62. The second bimetal member 82 has a shape that is separated from the outer peripheral surface of the nozzle pipe 62 in the low-temperature state to come into contact with the second support surface 73. On the other hand, the second bimetal member 82 is configured to have a shape along the outer peripheral surface of the nozzle pipe 62 in the high-temperature state.

It is desirable that the first bimetal member 81 and the second bimetal member 82 are integrally formed. As illustrated in FIG. 13 as an example, it is considered that two rectangular metal plates 91 and 93 having different thermal expansion coefficients are combined with each other. Specifically, recessed portions 92 that are recessed in a width direction are formed in central portions of one metal plate 91 in a longitudinal direction thereof. A pair of leg portions 94 that extend in the longitudinal direction are formed in the other metal plate. As represented by arrows in FIG. 13, two metal plates are overlapped with each other while the leg portions 94 are inserted into the recessed portions 92, respectively. Therefore, the two metal plates having different thermal expansion coefficients are overlapped with each other such that front and back surfaces are counterchanged on both sides in the longitudinal direction.

(Operation and Effect)

According to the above-described configuration, when the nozzle pipe 62 is in the low-temperature state, the nozzle pipe 62 comes into contact with the first member 70, and the second bimetal member 82 provided on the nozzle pipe 62 comes into contact with the second member 72. On the other hand, when the nozzle pipe 62 is in the high-temperature state, the nozzle pipe 62 is displaced in the first direction D1 to come into contact with the second member 72, and the first bimetal member 81 comes into contact with the first member 70. Further, the first bimetal member 81 comes into contact with the first member 70, and the second bimetal member 82 comes into contact with the second member 72 between the low-temperature state and the high-temperature state. As described above, each portion comes into contact with the first member 70 and the second member 72 depending on the state of the temperature change. Therefore, for example, as compared to a case where only the first member 70 and the second member 72 are provided as in the second embodiment, either the first bimetal member 81 or the second bimetal member 82 comes into contact with the first member 70 or the second member 72 throughout the entire temperature change range. As a result, it is possible to stably support the nozzle pipe 62 and to suppress vibration.

The third embodiment of the present disclosure has been described above. In addition, the above-described configuration can be changed or modified various manners without departing from the gist of the present disclosure. For example, the first bimetal member 81 and the second bimetal member 82 are not necessarily integrally formed and can also be separately formed. In addition, in a case where the first bimetal member 81 and the second bimetal member 82 are integrally formed, it is possible to reduce the number of components. Therefore, this configuration is advantageous in that manufacturing costs and maintenance costs can be reduced. Further, when a component falls off in the air intake duct 3 of the gas turbine 1, there is a great risk of causing serious damage to the subsequent equipment (the combustor 4 or the turbine 5). The risk can be reduced by reducing the number of components as described above.

<Supplementary Notes>

For example, the pipe support structures 7, 7b, 107, 107b, and 207 according to each of the above-described embodiments can be understood as follows.

(1) According to a first aspect, there is provided the pipe support structure 7 or 7b that supports a pipe including the header pipe 61 which extends in the first direction D1 in a cross section of a duct and in which the inlet 61a, into which a high-temperature fluid flows, is formed and a plurality of nozzle pipes 62 that are provided integrally with the header pipe 61, extend in the second direction D2 orthogonal to the first direction D1, and are arranged at intervals in the first direction D1. The pipe support structure 7 or 7b includes: the projecting portion 63 that projects from at least one surface in a third direction D3 orthogonal to the first direction D1 and the second direction D2 in an outer peripheral surface of the nozzle pipe 62; and the support member 65 or 65b which is fixed to the duct and in which the guide groove 66, to which the projecting portion 63 is fitted and which guides the projecting portion 63 in a thermal elongation direction of the header pipe 61 and the nozzle pipe 62, is formed.

According to the above-described configuration, each nozzle pipe 62 is supported from the third direction D3 by the support member 65 or 65b. Therefore, it is possible to suppress the occurrence of vibration even in a case where an exciting force is applied to the nozzle pipe 62. Further, the projecting portion 63 is guided in the thermal elongation direction of the header pipe 61 and the nozzle pipe 62 by the guide groove 66 of the support member 65 or 65b. Therefore, the nozzle pipe 62 can be stably supported without being deformed before and after the thermal elongation occurs.

(2) According to a second aspect, in the pipe support structure 7 or 7b according to (1), the inclined surface 67 that extends in the second direction D2 as the inclined surface 67 goes in the first direction D1 may be formed on an inner side wall of the guide groove 66.

According to the above-described configuration, since the inclined surface 67 is formed on the inner side wall of the guide groove 66, the projecting portion 63 is guided while coming into contact with the inclined surface 67. Therefore, the nozzle pipe 62 can be stably supported without being deformed before and after the thermal elongation occurs.

(3) According to a third aspect, in the pipe support structure 7 or 7b according to (2), the step surface 68 that is connected to the inclined surface 67 and that extends in the second direction D2 may be formed on the inner side wall of the guide groove 66.

According to the above-described configuration, in this state, the projecting portion 63 can be supported by the step surface 68 from both sides in the first direction D1. That is, the step surface 68 comes into contact with the projecting portion 63 in a direction directly opposite to the vibration direction of the nozzle pipe 62. Therefore, it is possible to further stably support the nozzle pipe 62.

(4) According to a fourth aspect, in the pipe support structure 7 or 7b according to any one of (1) to (3), for the guide groove 66 that is located at a position further away from the inlet 61a in the first direction D1, an angle of an extension direction of the guide groove 66 with respect to the second direction D2 may be larger.

According to the above-described configuration, for the guide groove 66 located at a position further away from the inlet 61a, the angle of the extension direction of the guide groove 66 with respect to the second direction D2 is larger. Therefore, it is possible to appropriately support the projecting portion 63 according to a change in the amount of thermal elongation based on the position of the nozzle pipe 62.

(5) According to a fifth aspect, there is provided the pipe support structure 107, 107b, or 207 that supports a pipe including the header pipe 61 which extends in the first direction D1 in a cross section of a duct and in which the inlet 61a, into which a high-temperature fluid flows, is formed and a plurality of nozzle pipes 62 that are provided integrally with the header pipe 61, extend in the second direction D2 orthogonal to the first direction D1, and are arranged at intervals in the first direction D1. The pipe support structure 107, 107b, or 207 includes: the first member 70 that is fixed to the duct and that has the first support surface 71 which is capable of coming into contact with each of the nozzle pipes 62 from a side close to the inlet 61a in the first direction D1; and the second member 72 that is fixed to the duct and that has the second support surface 73 which is capable of coming into contact with each of the nozzle pipes 62 from a side opposite to the inlet 61a in the first direction D1.

According to the above-described configuration, when the header pipe 61 and the nozzle pipe 62 are in a low-temperature state, the first support surface 71 of the first member 70 comes into contact with the nozzle pipe 62 to support the nozzle pipe 62. On the other hand, when the header pipe 61 and the nozzle pipe 62 are in a high-temperature state, the second support surface 73 of the second member 72 comes into contact with the nozzle pipe 62 moved in the first direction D1 to support the nozzle pipe 62. Therefore, it is possible to stably support the nozzle pipe 62 and to suppress vibration at a low temperature and at a high temperature.

(6) According to a sixth aspect, in the pipe support structure 107, 107b, or 207 according to (5), the first support surface 71 may extend in a direction further away from the nozzle pipe 62 as the first support surface 71 is further away from the inlet 61a in the first direction D1, and the second support surface 73 may extend in a direction closer to the nozzle pipe 62 as the second support surface 73 is further away from the inlet 61a in the first direction D1.

According to the above-described configuration, the nozzle pipe 62 can be interposed in the first direction D1 and the second direction D2 to be supported. Therefore, it is possible to more actively suppress vibration.

(7) According to a seventh aspect, in the pipe support structure 107, 107b, or 207 according to (5) or (6), for the first member 70 and the second member 72 that are located at positions further away from the inlet 61a in the first direction D1, a distance between the first member 70 and the second member 72 in the first direction D1 may be larger.

According to the above-described configuration, it is possible to appropriately support the projecting portion 63 according to a change in the amount of thermal elongation based on the position of the nozzle pipe 62.

(8) According to an eighth aspect, the pipe support structure 207 according to any one of (5) to (7) may further include: the first bimetal member 81 that is provided on the side close to the inlet 61a in the first direction D1 on an outer peripheral surface of each of the nozzle pipes 62, has a shape along the outer peripheral surface of the nozzle pipe 62 in a low-temperature state, and has a shape that is separated from the outer peripheral surface in a high-temperature state to come into contact with the first support surface 71; and the second bimetal member 82 that is provided on the side opposite to the inlet 61a in the first direction D1 on the outer peripheral surface of each of the nozzle pipes 62, has a shape that is separated from the outer peripheral surface of the nozzle pipe 62 in the low-temperature state to come into contact with the second support surface 73, and has a shape along the outer peripheral surface in the high-temperature state.

According to the above-described configuration, the first bimetal member 81 and the second bimetal member 82 come into contact with the first member 70 and the second member 72, respectively, according to the state of a temperature change, which makes it possible to stably support the nozzle pipe 62 and to suppress vibration.

(9) According to a ninth aspect, there is provided the air intake duct 3 including: the tubular duct main body 3a; a pipe (inlet bleed heater 6) that is disposed in the duct main body 3a; and the pipe support structure 7, 7b, 107, 107b, or 207 according to any one of (1) to (8) that supports the pipe.

According to the above-described configuration, it is possible to stably support the pipe in the duct main body 3a.

(10) According to a tenth aspect, there is provided the gas turbine 1 including: the air intake duct 3 according to (9); the compressor 2 that compresses air supplied through the air intake duct 3 to generate high-pressure air; the combustor 4 that mixes the high-pressure air with fuel and that burns a mixture to generate a high-temperature and high-pressure combustion gas; and the turbine 5 that is driven by the combustion gas.

According to the above-described configuration, it is possible to provide the gas turbine 1 that can be more stably operated.

INDUSTRIAL APPLICABILITY

It is possible to provide a pipe support structure, an air intake duct, and a gas turbine that have a simpler structure and that can suppress vibration while allowing thermal elongation of a pipe.

REFERENCE SIGNS LIST

1 Gas turbine
2 Compressor
3 Air intake duct
3a Duct main body
4 Combustor
5 Turbine
6 Inlet bleed heater (pipe)
7 Support structure
7b Support structure
20 Compressor rotor
21 Compressor casing
22 Compressor rotor blade row
23 Compressor rotor blade
24 Compressor stator blade row
25 Compressor stator blade
50 Turbine rotor
51 Turbine casing
52 Turbine rotor blade row
53 Turbine rotor blade
54 Turbine stator blade row
55 Turbine stator blade
56 Gas turbine rotor
57 Gas turbine casing
61 Header pipe
61a Inlet
62 Nozzle pipe
63 Projecting portion
64 Base plate
65 Support member
65b Support member
66 Guide groove
67 Inclined surface
68 Step surface
70 First member
71 First support surface
72 Second member
73 Second support surface
81 First bimetal member
82 Second bimetal member
91 Metal plate
92 Recessed portion
93 Metal plate
94 Leg portion
107 Support structure
107b Support structure
207 Support structure
D1 First direction
D2 Second direction
D3 Third direction
O Axis

The invention claimed is:

1. A pipe support structure that supports a pipe including a header pipe which extends in a first direction in a cross section of a duct and in which an inlet, into which a high-temperature fluid flows, is formed, and a plurality of nozzle pipes that are provided integrally with the header pipe, wherein the plurality of nozzle pipes extend in a second direction orthogonal to the first direction, and are arranged at intervals in the first direction, the pipe support structure comprising:

a projecting portion that projects from at least one surface in a third direction orthogonal to the first direction and the second direction in an outer peripheral surface of at least one of the plurality of nozzle pipes; and a support member which is fixed to the duct and in which a guide groove, to which the projecting portion is fitted and which guides the projecting portion in a thermal elongation direction of the header pipe and the at least one of the plurality of nozzle pipes, is formed.

2. The pipe support structure according to claim 1,
wherein an inclined surface that extends in the second direction as the inclined surface goes in the first direction is formed on an inner side wall of the guide groove.

3. The pipe support structure according to claim 2,
wherein a step surface that is connected to the inclined surface and that extends in the second direction is formed on the inner side wall of the guide groove.

4. The pipe support structure according to claim 1,
wherein, for the guide groove that is located at a position further away from the inlet in the first direction, an angle of an extension direction of the guide groove with respect to the second direction is larger.

5. An air intake duct comprising:
a tubular duct main body;
a pipe that is disposed in the tubular duct main body; and
the pipe support structure according to claim 1 that supports the pipe.

6. A gas turbine comprising:
the air intake duct according to claim 5;
a compressor that compresses air supplied through the air intake duct to generate high-pressure air;
a combustor that mixes the high-pressure air with fuel and that burns a mixture to generate a high-temperature and high-pressure combustion gas; and
a turbine that is driven by the high-temperature and high-pressure combustion gas.

7. A pipe support structure that supports a pipe including a header pipe which extends in a first direction in a cross section of a duct and in which an inlet, into which a high-temperature fluid flows, is formed, and a plurality of nozzle pipes that are provided integrally with the header pipe, wherein the plurality of nozzle pipes extend in a second direction orthogonal to the first direction, and are arranged at intervals in the first direction, the pipe support structure comprising:
first members that are fixed to the duct, and second members that are fixed to the duct such that each nozzle pipe of the plurality of nozzle pipes is arranged between a respective one of the first members and a respective one of the second members relative to the first direction,
wherein for each nozzle pipe of the plurality of nozzle pipes, the respective one of the first members has a first support surface which is capable of coming into contact with nozzle pipe from a side of the nozzle pipe that is closer to the inlet in the first direction,
wherein for each nozzle pipe of the plurality of nozzle pipes, the respective one of the second members has a second support surface which is capable of coming into contact with the nozzle pipe from a side of the nozzle pipe that is farther from the inlet in the first direction, and
wherein, for each nozzle pipe of the plurality of nozzle pipes, a distance between the respective one of the first members and the respective one of the second members in the first direction increases with distance from the inlet in the first direction.

8. The pipe support structure according to claim 7,
wherein for each nozzle pipe of the plurality of nozzle pipes, the first support surface extends in a direction further away from the nozzle pipe as the first support surface is further away from the inlet in the first direction, and
for each nozzle pipe of the plurality of nozzle pipes, the second support surface extends in a direction closer to the nozzle pipe as the second support surface is further away from the inlet in the first direction.

9. The pipe support structure according to claim 7, wherein:
for each nozzle pipe of the plurality of nozzle pipes, a first bimetal member that is provided on the side of the nozzle pipe that is closer to the inlet in the first direction on an outer peripheral surface of the nozzle pipe, the first bimetal member having a shape along the outer peripheral surface of the nozzle pipe in a low-temperature state, and having a shape that is separated from the outer peripheral surface in a high-temperature state to come into contact with the first support surface, and
for each nozzle pipe of the plurality of nozzle pipes, a second bimetal member is provided on the side of the nozzle pipe that is farther from the inlet in the first direction on the outer peripheral surface of the nozzle pipe, the second bimetal member having a second shape that is separated from the outer peripheral surface of the nozzle pipe in the low-temperature state to come into contact with the second support surface, and wherein the second shape is along the outer peripheral surface in the high-temperature state.

10. An air intake duct comprising:
a tubular duct main body;
a pipe that is disposed in the tubular duct main body; and
the pipe support structure according to claim 7 that supports the pipe.

11. A gas turbine comprising:
the air intake duct according to claim 10;
a compressor that compresses air supplied through the air intake duct to generate high-pressure air;
a combustor that mixes the high-pressure air with fuel and that burns a mixture to generate a high-temperature and high-pressure combustion gas; and
a turbine that is driven by the high-temperature and high-pressure combustion gas.

12. A pipe support structure that supports a pipe including a header pipe which extends in a first direction in a cross section of a duct and in which an inlet, into which a high-temperature fluid flows, is formed, and a plurality of nozzle pipes that are provided integrally with the header pipe, wherein the plurality of nozzle pipes extend in a second direction orthogonal to the first direction, and are arranged at intervals in the first direction, the pipe support structure comprising:
first members that are fixed to the duct, and second members that are fixed to the duct such that each nozzle pipe of the plurality of nozzle pipes is arranged between a respective one of the first members and a respective one of the second members relative to the first direction,
wherein for each nozzle pipe of the plurality of nozzle pipes, the respective one of the first members has a first support surface which is capable of coming into contact with the nozzle pipe from a side of the nozzle pipe that is closer to the inlet in the first direction,
wherein for each nozzle pipe of the plurality of nozzle pipes, the respective one of the second members has a second support surface which is capable of coming into contact with the nozzle pipe from a side of the nozzle pipe that is farther from the inlet in the first direction,
wherein for each nozzle pipe of the plurality of nozzle pipes, a first bimetal member is provided on the side of the nozzle pipe that is closer to the inlet in the first direction on an outer peripheral surface of the nozzle pipe, the first bimetal member having a shape along the outer peripheral surface of the nozzle pipe in a low-temperature state, and having a shape that is separated from the outer peripheral surface in a high-temperature state to come into contact with the first support surface, and
wherein for each nozzle pipe of the plurality of nozzle pipes, a second bimetal member is provided on the side of the nozzle pipe that is farther from the inlet in the first direction on the outer peripheral surface of the nozzle pipe, the second bimetal member having a second shape that is separated from the outer peripheral surface of the nozzle pipe in the low-temperature state to come into contact with the second support surface, and wherein the second shape is along the outer peripheral surface in the high-temperature state.

* * * * *